US012540009B2

(12) United States Patent
Williams et al.

(10) Patent No.: US 12,540,009 B2
(45) Date of Patent: Feb. 3, 2026

(54) STORAGE BOX LIGHT

(71) Applicant: Techtronic Cordless GP, Anderson, SC (US)

(72) Inventors: Brianna E. Williams, Mauldin, SC (US); Jeffrey Groves, Greenville, SC (US); Tyler H. Knight, Greenville, SC (US); Connor Irwin, Anderson, SC (US)

(73) Assignee: TECHTRONIC CORDLESS GP, Anderson, SC (US)

( * ) Notice: Subject to any disclaimer, the term of this patent is extended or adjusted under 35 U.S.C. 154(b) by 0 days.

(21) Appl. No.: 19/005,085

(22) Filed: Dec. 30, 2024

(65) Prior Publication Data

US 2025/0128857 A1 Apr. 24, 2025

Related U.S. Application Data

(60) Division of application No. 18/382,155, filed on Oct. 20, 2023, now Pat. No. 12,214,931, which is a continuation of application No. 17/932,562, filed on Sep. 15, 2022, now Pat. No. 11,827,415.

(60) Provisional application No. 63/319,209, filed on Mar. 11, 2022, provisional application No. 63/245,047, filed on Sep. 16, 2021.

(51) Int. Cl.

*B65D 21/08* (2006.01)
*B65D 21/02* (2006.01)
*B65D 51/24* (2006.01)
*F21V 21/30* (2006.01)

(52) U.S. Cl.

CPC ....... *B65D 21/083* (2013.01); *B65D 21/0223* (2013.01); *B65D 51/248* (2013.01); *F21V 21/30* (2013.01)

(58) Field of Classification Search

CPC .............................. F21V 21/30; B54D 51/248
See application file for complete search history.

(56) References Cited

U.S. PATENT DOCUMENTS 10,752,403 B1 * 8/2020 Rinear .................... B60R 11/00
10,962,218 B2 * 3/2021 Plato ....................... F21V 21/30
2023/0078495 A1 * 3/2023 Williams ................. B25H 3/02 362/154
2023/0288046 A1 * 9/2023 Williams .............. F21V 21/088

OTHER PUBLICATIONS

Innovation Q+ NPL Search (Year: 2024).*

* cited by examiner

*Primary Examiner* — Anabel Ton
(74) *Attorney, Agent, or Firm* — Dority & Manning, P.A.

(57) ABSTRACT

The present subject matter provides a storage system including a storage box and a light assembly. The storage box includes a box base with a mounting structure configured to be coupled to a modular storage system. A lid is coupled to the box base. The light assembly includes a base, a leg, and a light source. The leg is coupled to the base or the lid and is rotatable about a rotation axis. The light source is pivotally coupled to the leg and is rotatable about a rotation axis.

20 Claims, 17 Drawing Sheets

STORAGE BOX LIGHT

CROSS-REFERENCE TO RELATED APPLICATIONS

This application is a divisional of U.S. patent application Ser. No. 18/382,155, filed on Oct. 20, 2023, which is a continuation of U.S. patent application Ser. No. 17/932,562, filed on Sep. 15, 2022, which claims priority to U.S. Provisional Patent Application No. 63/245,047 filed on Sep. 16, 2021, and to U.S. Provisional Patent Application No. 63/319,209, filed on Mar. 11, 2022, the entire content of each of which is incorporated by reference.

FIELD

The present disclosure relates to storage box lighting that is mountable in combination with additional storage boxes or other components of a storage system.

BACKGROUND

Modular storage systems are frequently used in workspaces, such as a garage, in order to provide substantial ability to customize the available storage to accommodate a variety of tools and supplies owned and stored by a user. Examples of components of a modular storage system include storage bins having various sizes, shelves, tables, and rails. The components of the modular storage system often incorporate a common mounting interface positioned at equal intervals along the height and width of the storage components to provide yet more ability to customize to the user's preference.

SUMMARY

The present disclosure provides, in one aspect, a module storage system, with the system including a storage box and a light assembly. The storage box includes a base with a mounting structure configured to be coupled to a modular storage system a lid coupled to the base of the storage box. The light assembly includes a first leg and a second leg. Each of the first and second legs are pivotally coupled to the base or the lid and rotatable about a first rotation axis.

The present disclosure provides, in another aspect, a storage system including a storage box and a light assembly. The storage box includes a box base that includes a mounting structure configured to be coupled to a modular storage system. A lid is coupled to the box base. The light assembly includes a base with mounting features configured to be coupled to a storage box. A leg is coupled to the base and is movable about a first rotation axis and a second rotation axis different from the first rotation axis. A light source is coupled to the leg and is pivotable about a third rotation axis that is different than the first and second rotation axes.

The present disclosure provides, in another aspect, a system that includes a storage box and a light assembly. The storage box includes a base that has a mounting structure that is configured to be coupled to a modular storage system. A lid is coupled to the base. The light assembly includes a base, a lid and alight source. The base includes a mounting structure that is configured to be coupled to the storage box. The lid is pivotally coupled to the base. The light source is coupled to the base or the lid and is movable inward and outward relative to the base between a stored position and a deployed position.

The present disclosure provides, in another aspect, a storage box light including a base, a lid, and a light source. The base includes a mounting structure configured to be coupled to a modular storage system. The lid is pivotally coupled to the base. The light source is coupled to the base or the lid and is configured to rotate about a rotational axis.

The present disclosure provides, in another aspect, a plurality of light sources coupled to the base and pivotable relative to the base.

The present disclosure provides, in another aspect, a storage box light including a base, a leg, and a light source. The base is configured to be coupled to a modular storage system via a mounting structure. The leg is pivotally coupled to the base. The light source is pivotally coupled to the leg and is rotatable about a rotational axis. In one exemplary embodiment, the storage box light includes a second leg pivotally coupled to the base and a second light source pivotally coupled to the second leg.

The present disclosure provides, in another aspect, a storage box light including a base, a light source, a first leg and a second leg. The first leg includes a first link and a second link. The second leg also includes a first link and a second link. The first links of the first and second legs are pivotally coupled to the base, the second links of the first and second legs are pivotally coupled to the first legs, and the light source is pivotally coupled to the second links of the first and second legs.

The present disclosure provides, in another aspect, a base, a lid, and a light source. The base defines an interior compartment and is configured to be coupled to a modular storage system. The lid is pivotally coupled to the base. The light source is coupled to the base or the lid and is movable inward and outward relative to the base between a stored position and a deployed position.

The present disclosure provides, in another aspect, a storage box light including a housing that supports a light source that is angled outward and downward to shine light into the interior compartment of a storage box. The storage box light includes a pair of legs extending from the housing that define a channel that receives a rib of a storage box.

The present disclosure provides, in another aspect, a storage light including a power strip that may be coupled to a storage box or other component of a modular storage system. The storage light supports a plurality of ports, a first light source and a second light source, and switches which operate the ports and light sources. The first and second light sources are pivotable relative to the power strip. The storage light receives power from an alternating current (AC) power source via a cord and distributes power through the ports.

Other features and aspects of the subject matter will become apparent by consideration of the following detailed description ad accompanying drawings.

DETAILED DESCRIPTION

Before any embodiments of the present subject matter are explained in detail, it is to be understood that the subject matter is not limited in its application to the details of construction and the arrangement of components set forth in the following description or illustrated in the following drawings. The subject matter is capable of other embodiments and of being practiced or of being carried out in various ways. Also, it is to be understood that the phraseology and terminology used herein is for the purpose of description and should not be regarded as limiting.

Figure 1:
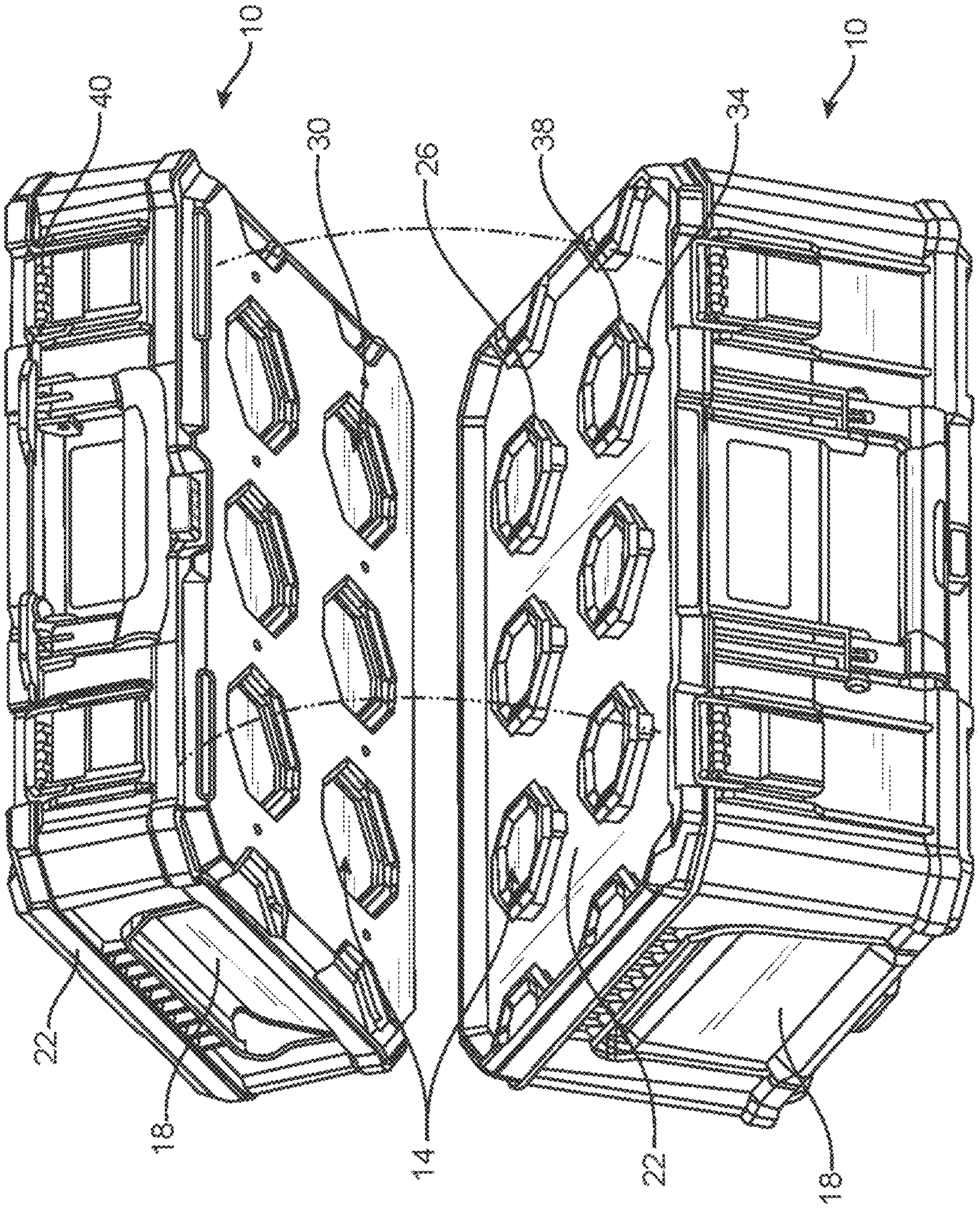
FIG. 1 is a perspective view of two storage boxes of a storage system in a detached state and including mounting structures.
Figure 2:
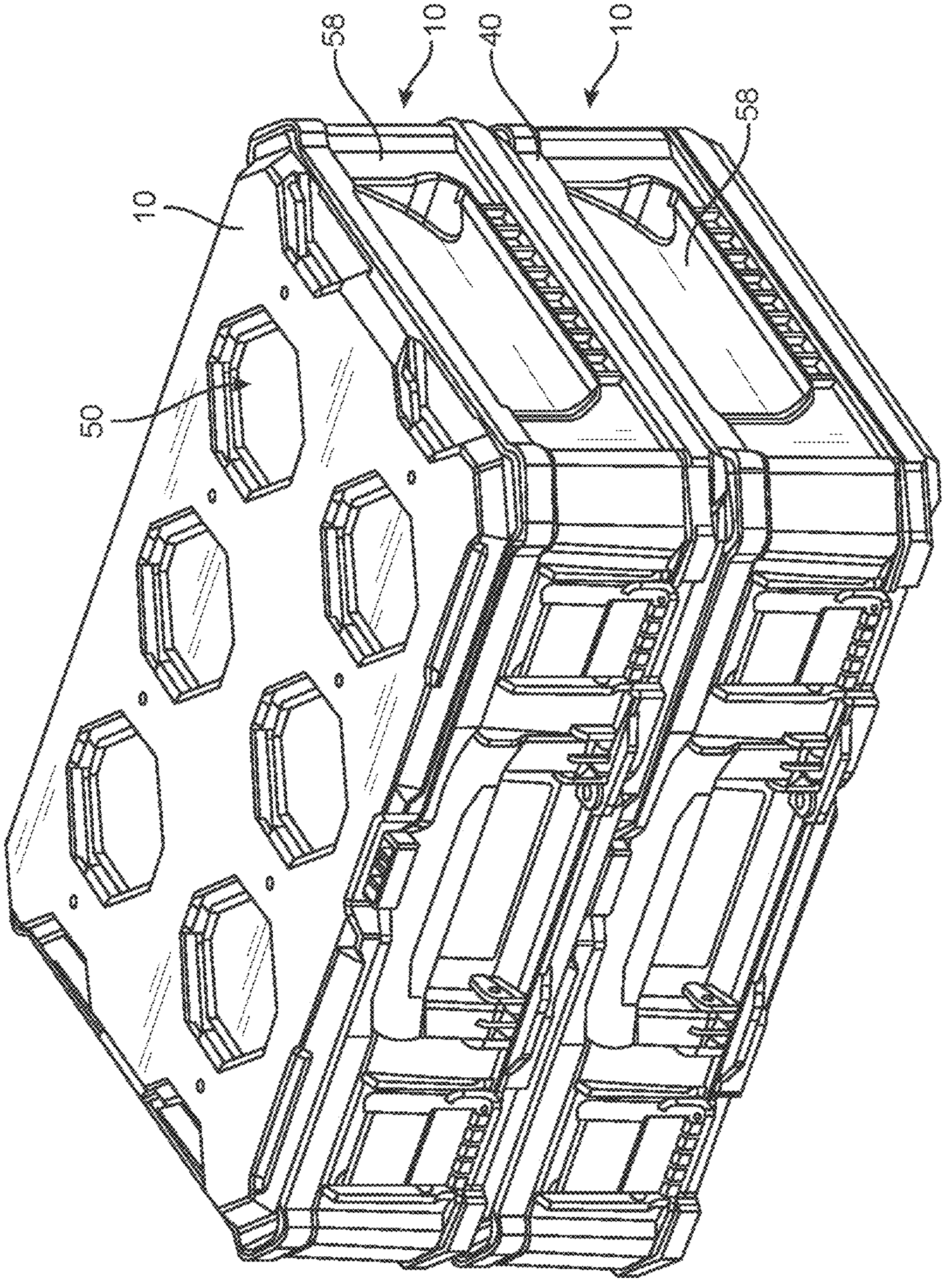
FIG. 2 is a perspective view of two storage boxes of a storage system in a coupled state and including mounting structures.

FIGS. 1 and 2 illustrate a storage system 1 for storage of tools and supplies to be used at a worksite and that includes storage boxes 10 that may have the same or different capacities and/or sizes. The storage boxes 10 may incorporate coupling or mounting structures 14 that interact to facilitate the coupling and/or mounting of modular storage components, including various sizes of storage boxes 10 to facilitate a compact, secure, and sturdy storage of components (e.g., power tools, power tool accessories, and/or the like).

FIG. 1 illustrates modular storage boxes 10 with mounting structures 14 that facilitate sturdy storage of the modular storage boxes 10. Each storage box 10 includes a box base 18 that defines an interior compartment (not shown) and a lid 22 that may be pivotally coupled to the box base 18 and locked in a locked position. The lid 22 may contain mounting structures 14 such as one or more protrusions 26 (or depressions in other embodiments) that align with depressions 30 (or protrusions in other embodiments) on an opposing base 18 of a separate storage box 10 for positioning the box base 18 of one storage box 10 on the lid 22 of another storage box 10. An exemplary protrusion 26 may include a base portion 34 extending from the lid 22 with an overhang portion 38 supported on the base portion 34 of each protrusion 26. The lid 22 of a storage box 10 may incorporate one or more latches 40 or other mechanisms for securing the lid 22 of the storage box 10 to the box base 18 of another storage box 10. The exemplary structures allow for interchangeable combination of different sizes of storage boxes with the structures providing sturdy alignment regardless of the combination of the storage boxes 10. FIG. 2 shows other exemplary storage boxes 10 with a lid 44 including depressions 50 that align with protrusions on an opposing base 58 of a second storage box 10.

Figure 3:
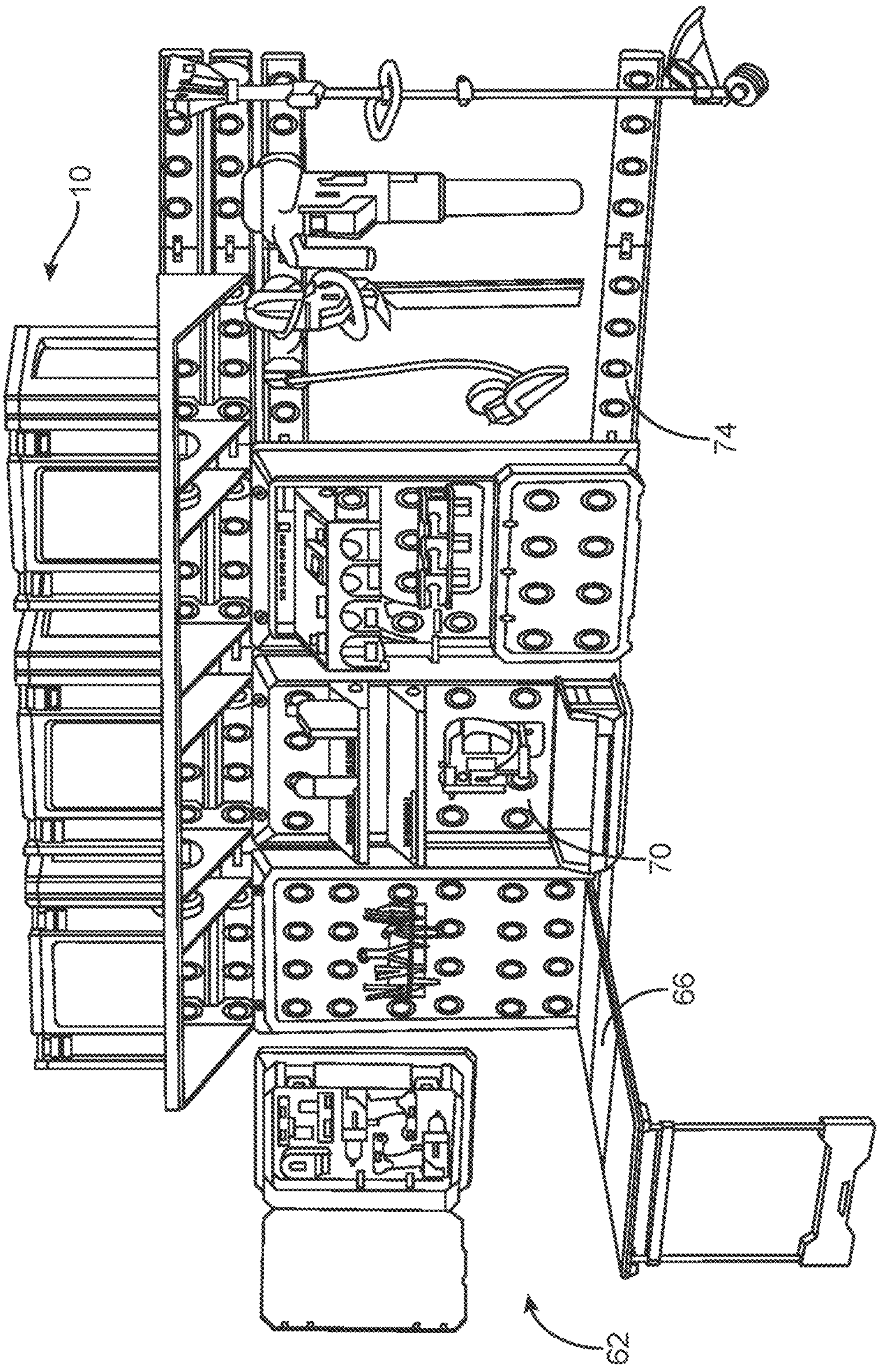
FIG. 3 is a perspective view of a workspace with a storage system.
Figure 4:
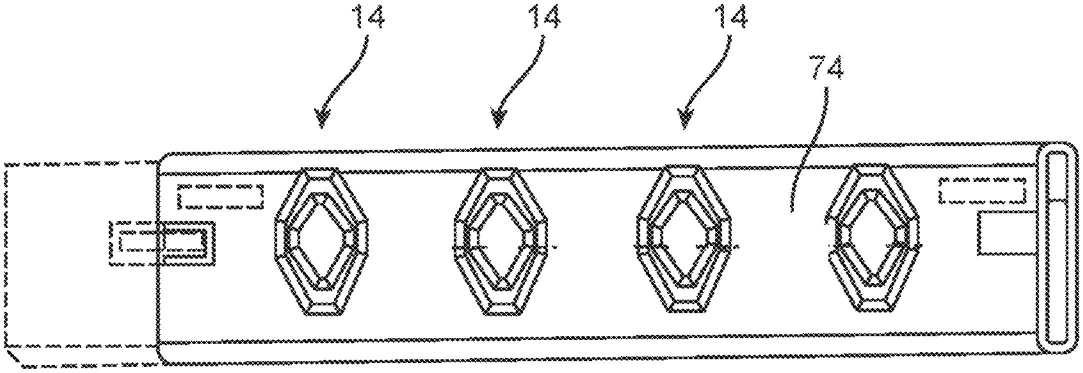
FIG. 4 is a perspective view of a rail.

FIG. 3 illustrates a storage box 10 included in another embodiment of a modular storage system 62. With reference to FIGS. 3 and 4, the storage system 62 may include other components for storage and mounting of tools and supplies, such as a table 66, a panel 70, or a rail 74 that include mounting structures 14 (protrusions 26). The mounting structures 14 of each component of the modular storage system 62, including the mounting structures 14 of the storage box 10, are positioned such that the spacing (horizontal and vertical spacing) between adjacent mounting structures 14 is consistent for all components of the modular storage system 62.

Figure 5:
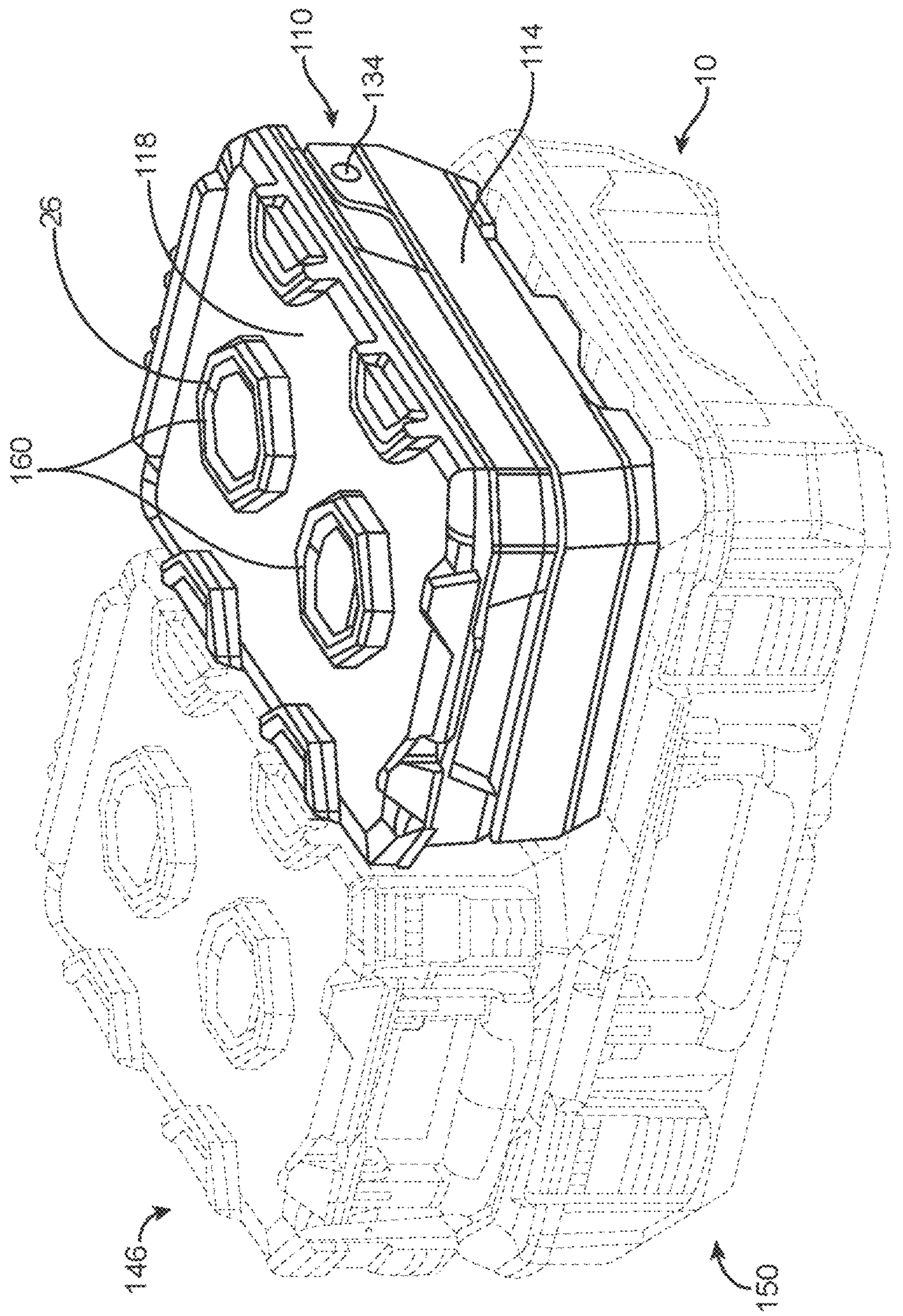
FIG. 5 is a perspective view of a storage box light embodying the present subject matter.
Figure 6:
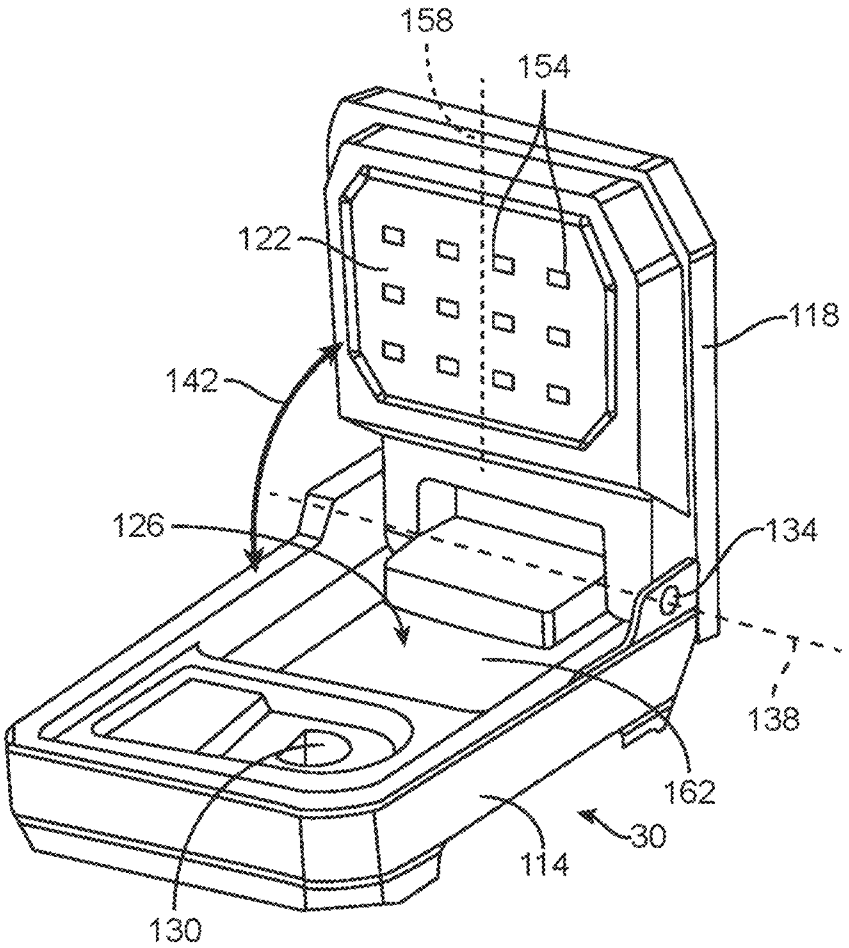
FIG. 6 is a perspective view of a storage box light of FIG. 5 and illustrating a movable lid with light source.

FIGS. 5 and 6 illustrate an exemplary storage box light, light assembly 110, that can be implemented with one or more storage boxes 10. The light assembly 110 includes a base 114 and a lid 118 that supports a light source 122. The base 114 and lid 118 are composed of a durable material such as a plastic, or other resilient material capable of withstanding wear. The base 114 connects to the storage box 10 via mounting structures 14, such as depressions 30 that are the same as or similar to those described relative to FIGS. 1-4. In the illustrated embodiment, the base 114 defines an interior compartment 126 such that the light assembly 110 defines a storage box similar to or the same as storage box 10 having a light source 122 integrated with a lid 22. In other embodiments, the light assembly 110 may be used as a standalone light assembly that mounts to a component of a modular storage system 62, in which the base 114 is connectable to a storage box 10 via mounting structures 14. For instance, the light assembly may include a base 114 and a light source 122 pivotally coupled to the base 114. The base 114 may exclude the interior compartment 126 and instead defines a substantially planar contact surface having a sufficient area for stable placement of the light assembly on a work surface.

The interior compartment may include a port 130. The port 130 is illustrated as a receptacle configured to receive a 12v tower-style battery pack, although the port may instead be configured to receive other battery pack styles or the connector of a power cord, such as a USB connector for electrical connection of a phone or tablet. In other embodiments, the port 130 is configured to receive a 4v battery pack or other lower voltage power sources having a voltage in a range of 2v to 12v. The lid 118 is connected to the base 114 at a pivot 134 and is rotatable relative to the base 114 about a pivot axis 138. From the closed position embodied in FIG. 5, the lid 118 is pivotable to an open position embodied in FIG. 6 in a range of about 180 degrees (angle 142 in FIG. 6 illustrates the lid 118 opened to around 90 degrees).

The illustrated light assembly 110 is approximately the same size as a small storage box 146 ("approximately" meaning within about +/−5% of the same size, where "size" refers to length, width, and/or volume) so that the light assembly 110 can be positioned adjacent the small storage box 146 (e.g., on the lid 22 of a large storage box 150 as shown in FIG. 5). The light assembly 110 may instead be another size, either smaller than or larger than a small storage box 146. The illustrated light source 122 is a single panel light, although more than one panel light may be included. The light source 122 may take other forms (e.g., individual lights or a different grouping of lights). The single panel light may include LEDs 154 or other source of light. In some embodiments, the light assembly 110 may include a swivel that allows rotation of the light source 122 about a second pivot axis 158 that is substantially perpendicular to the first pivot axis 138. The lid 118 also has mounting structures 160, such as protrusions 26, that can interface with the mounting structures 14, such as depressions 30, on the box base 18 of other storage boxes 10. A tray 162 is positioned in the interior compartment 126 for storage of items. A switch (not shown) may be positioned in the interior compartment 126.

Figure 7:
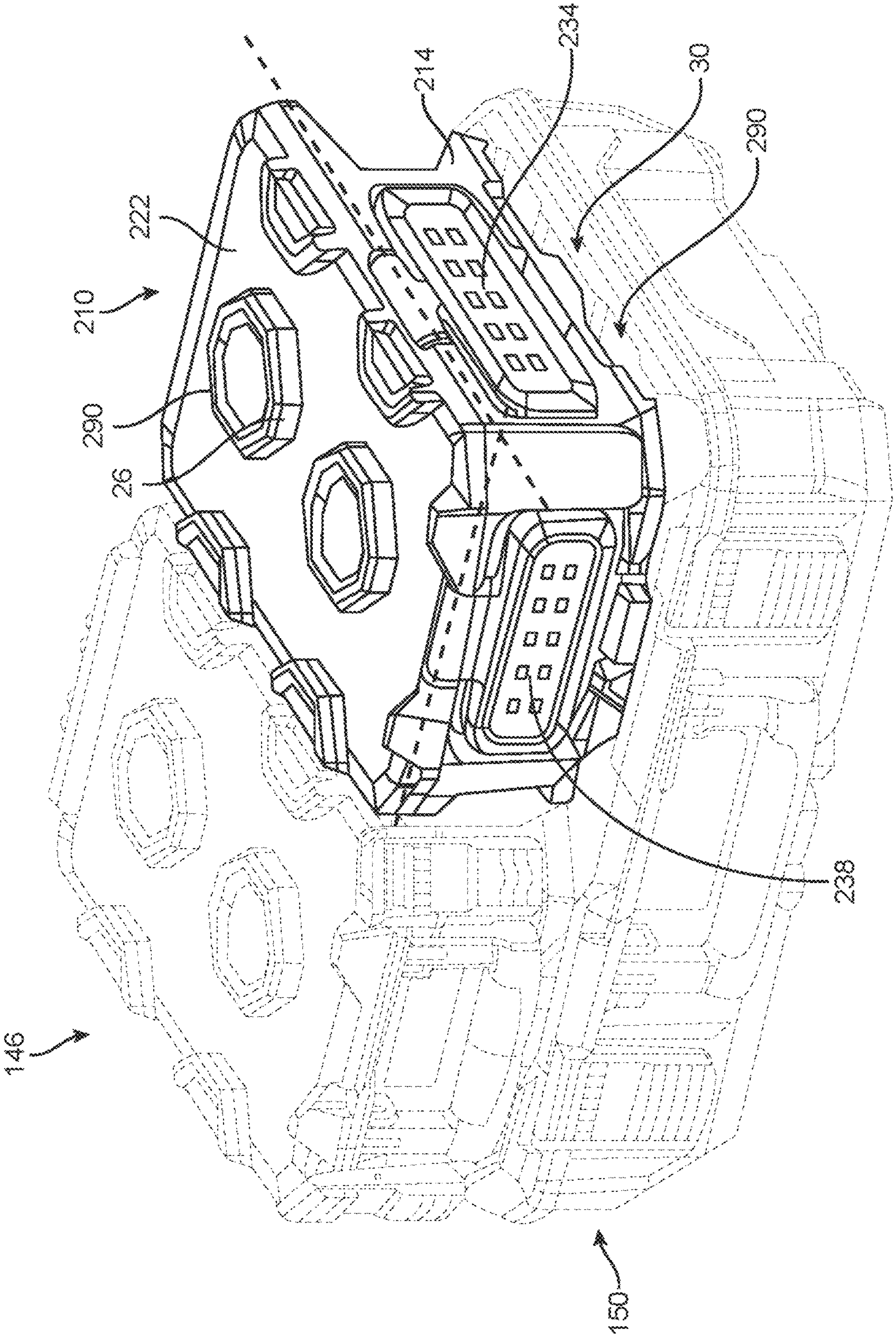
FIG. 7 is a perspective view of another storage box light embodying the present subject matter.
Figure 8:
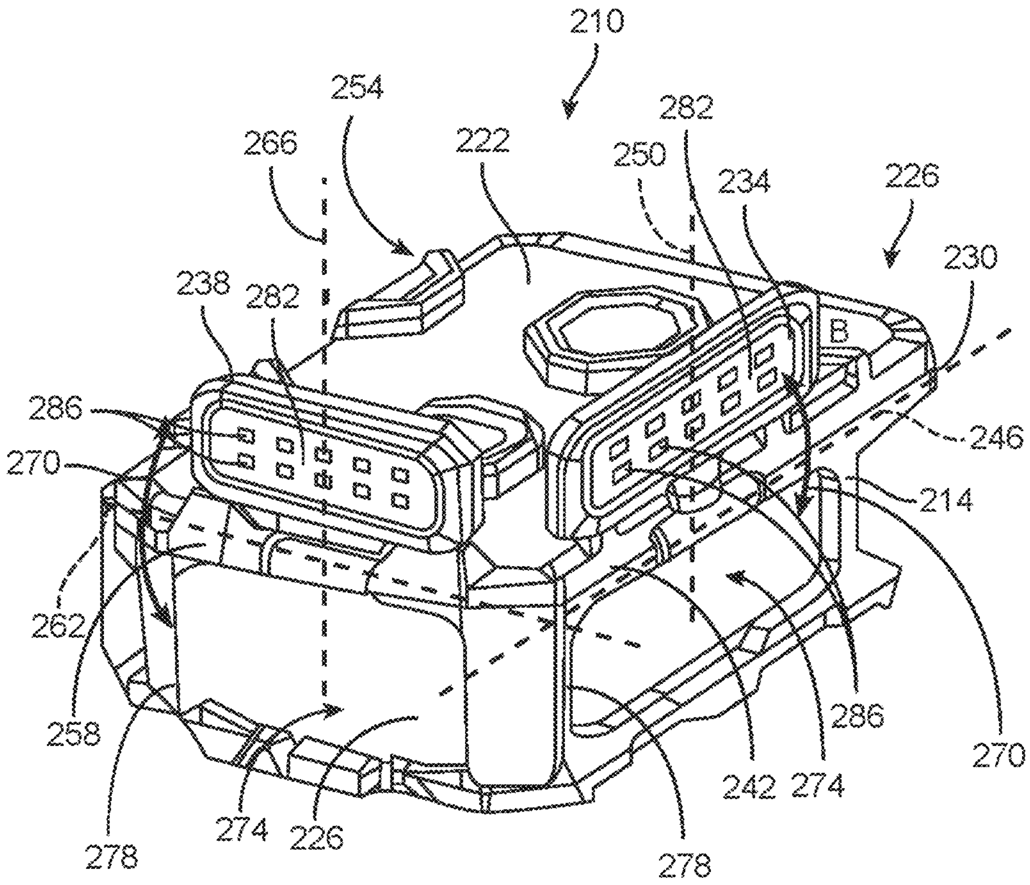
FIG. 8 is a perspective view of a storage box light of FIG. 7 and illustrating rotating and swiveling light panels.

FIGS. 7 and 8 illustrate another exemplary storage box light, light assembly 210, including a base 214 that defines an interior compartment that is the same as or similar to the interior compartment 126 of FIG. 6. A lid 222 is pivotably connected to a longitudinal side 226 of the base 214 at a pivot 230. The lid 222 is pivotable between a closed position and an open position. In the closed position, the lid 222 encloses the interior compartment. The illustrated light assembly 210 is the same size as a small storage box 146.

The light assembly 210 includes a first light panel 234, a second light panel (not shown), and a third light panel 238 that are pivotally coupled to the lid 222 in different locations, although any of the light panels may instead be pivotally coupled to the base 214. As illustrated, the first light panel 234 is coupled to the lid 222 at a midpoint along the length of a first lateral side 242 of the lid 222 (i.e., on an edge of the lid 222 as shown in FIG. 8). In some embodiments, the first light panel 234 may be coupled to the lid 222 at other positions along the length of the first lateral side 242 of the lid 222, or to other sides of the lid 222. The light panel 234 is pivotable about a first axis or pivot axis 246 from a folded position (FIG. 7) to a deployed or upright position (FIG. 8). The light panel 234 is also pivotable about a second axis or swivel axis 250. The second light panel (not shown) is the same as or similar to the first light panel 234 and is pivotally coupled to the lid 222 or, alternatively, to the base 214, at a second lateral side 254 opposite the first lateral side 242.

The third light panel 238 is pivotally coupled to an adjacent longitudinal side 258 of the lid 222. As illustrated, the third light panel 238 is coupled to the lid 222 at a midpoint along the length of the longitudinal side 258 of the lid 222 (i.e. on an edge of the lid 222 as shown in FIG. 8). In some embodiments, the third light panel 238 may be coupled to the lid 222 at other positions along the length of the longitudinal side 258 of the lid 222. The third light panel 238 is pivotable about a pivot axis 262 and a swivel axis 266 independent of the first light panel 234. Fewer or more than three light panels are possible. Each light panel 234, 238 is pivotable about the pivot axis 246, 262 through an angle 270 which is approximately 180 degrees in the illustrated embodiment. Each light panel 234, 238 also can swivel or rotate clockwise or counter-clockwise (when viewed from above) about the respective swivel axes 250, 266 without a stop (i.e. the light panels 234, 238 are rotatable 360 degrees or any degree of rotation below 360 degrees).

The base 214 defines storage recesses 274 that receive the light panels 234, 238 when the light panels 234, 238 are in the folded position, allowing the light panels 234, 238 to be stored in a substantially flush relationship with sides 278 of the base 214 (FIG. 7). Each of the light panels 234, 238 supports a light source 282, which may include a plurality of LEDs 286, or other source of illumination.

The base 214 and lid 222 of the light assembly 210 include mounting structures 290 (protrusions 26 extending from the lid 222 and depressions 30 positioned in the base 214) which interface with the mounting structures 14 of other storage boxes 10 to securely position the light assembly 210. The base 214 may have a port (not shown) similar to or the same as port 130 (FIG. 6) configured to receive a battery pack or electrical cord. The port may be positioned in the longitudinal side 226 (or any of the other sides or in the interior compartment).

Figure 9:
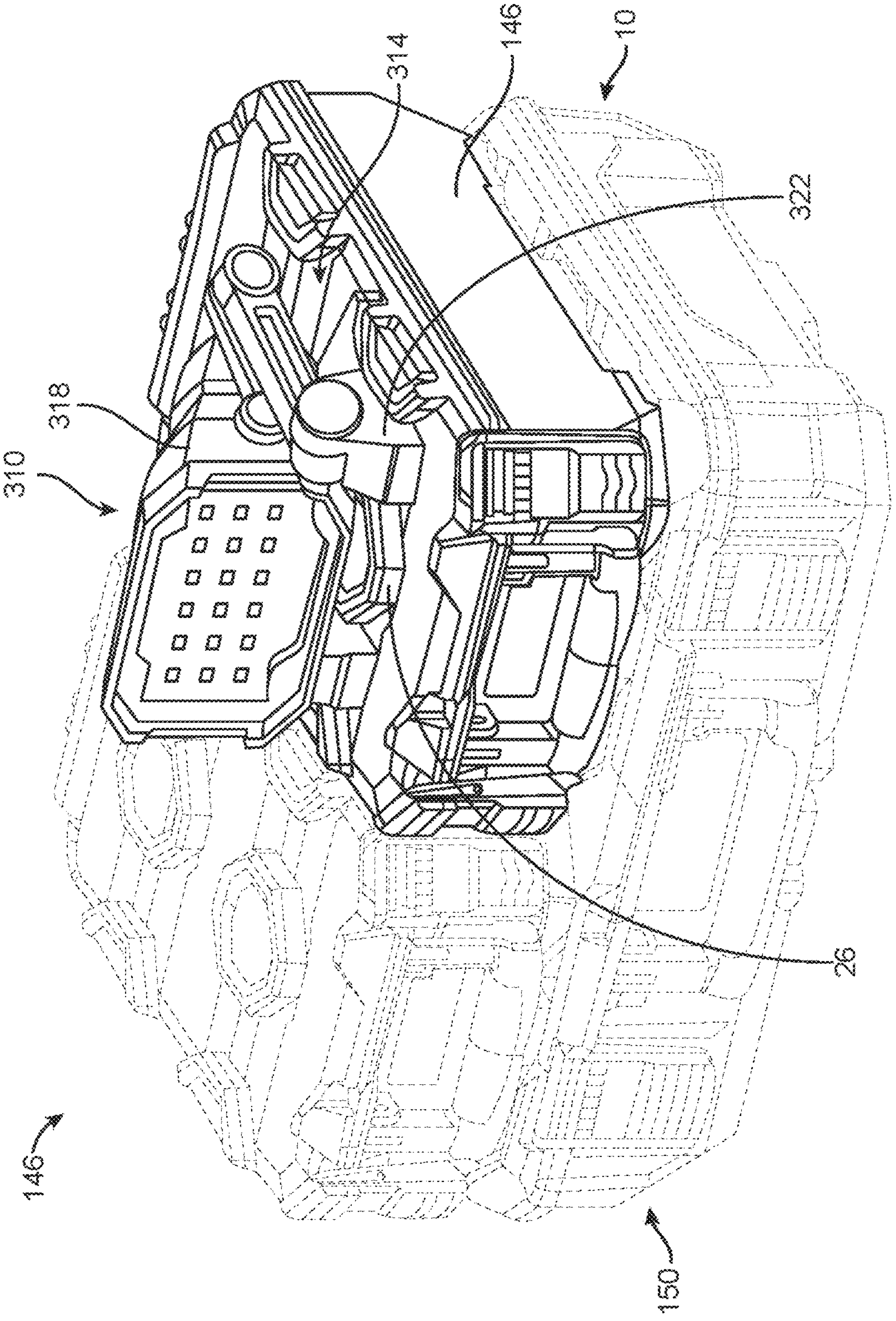
FIG. 9 is a perspective view of another storage box light embodying the present subject matter illustrating a stored state.
Figure 10:
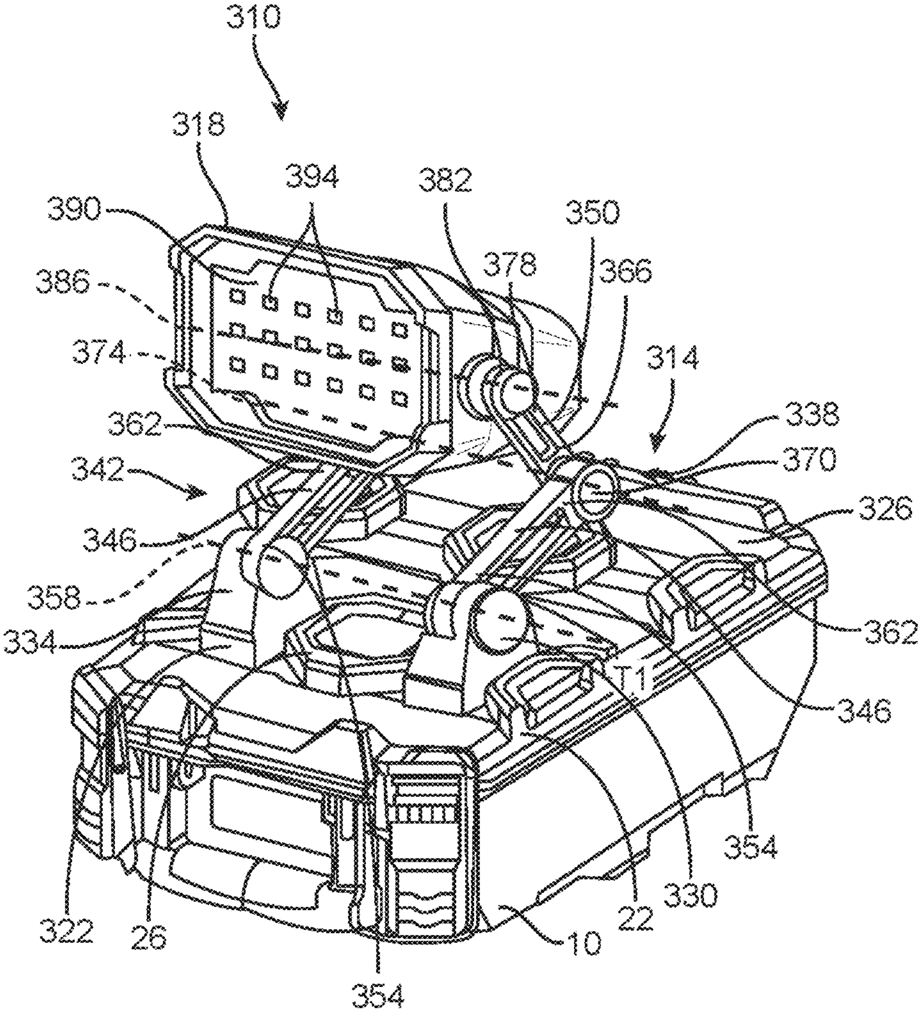
FIG. 10 is a perspective view of a storage box light of FIG. 9 and illustrating a deployed state.

FIGS. 9 and 10 show another exemplary storage box light, light assembly 310, that includes a stand 314 and a light panel 318 coupled to the stand 314. The stand 314 is compatible with a storage box 10, such as small storage box 146. The stand 314 includes a base, or foot 322 that interfaces with and is supported by the upper surface 326 of the lid 22 of a separate storage box 10 and aligns with mounting structures 14, such as protrusions 26 extending from the lid 22 for stable use of the light assembly 310. The foot 322 includes a first foot pivot 330 and a second foot pivot 334, with a first leg 338 pivotally coupled to the first foot pivot 330 and a second leg 342 pivotally coupled to a second foot pivot 334. In some embodiments, for instance, the embodiment of FIGS. 9 and 10, the second leg 342 is the same as or substantially similar to the first leg 338 and components comprising the first leg 338 also comprise the second leg 342. While some portions of the second leg 342 are not completely illustrated, the numbering of and description of the structure of the second leg 342 is identical to the structure and numbering of the first leg 338. Each of the first and second legs 338, 342 includes a first link 346 and second link 350. The first link 346 of each of the first and second legs 338, 342 has a first end 354 pivotally connected to the foot 322 at the first and second foot pivots 330, 334, with the first link 346 pivotable relative to the foot 322 about a first pivot axis 358 that is aligned between the first and second foot pivots 330, 334. The first link 346 is pivotable about the first pivot axis 358 through a 360-degree range. The second end 362 of the first link 346 is pivotably connected to the first end 366 of the second link 350 at a leg pivot 370. The second link 350 is pivotable relative to the first link 346 about a second pivot axis 374, and the second pivot axis 374 is parallel or substantially parallel to the first pivot axis 358. The second link 350 is pivotable about the second pivot axis 374 through a range of 360 degrees.

The light panel 318 is pivotably coupled to the second end 378 of the second link 350 of the first and second legs 338, 342 at respective light pivots 382 positioned on opposite sides of the light panel 318. The light panel 318 is pivotable relative to the first and second legs 338, 342 about a third pivot axis 386 that is parallel or substantially parallel to the first and second pivot axes 358, 374. The light panel 318 supports a light source 390, which may include LEDs 394. The light source 390 projects light in a direction substantially perpendicular to the third pivot axis 386. The first and second links 346, 350 provide for the light panel 318 to fold to a collapsed state for more compact storage as shown in FIG. 9.

Figure 11:
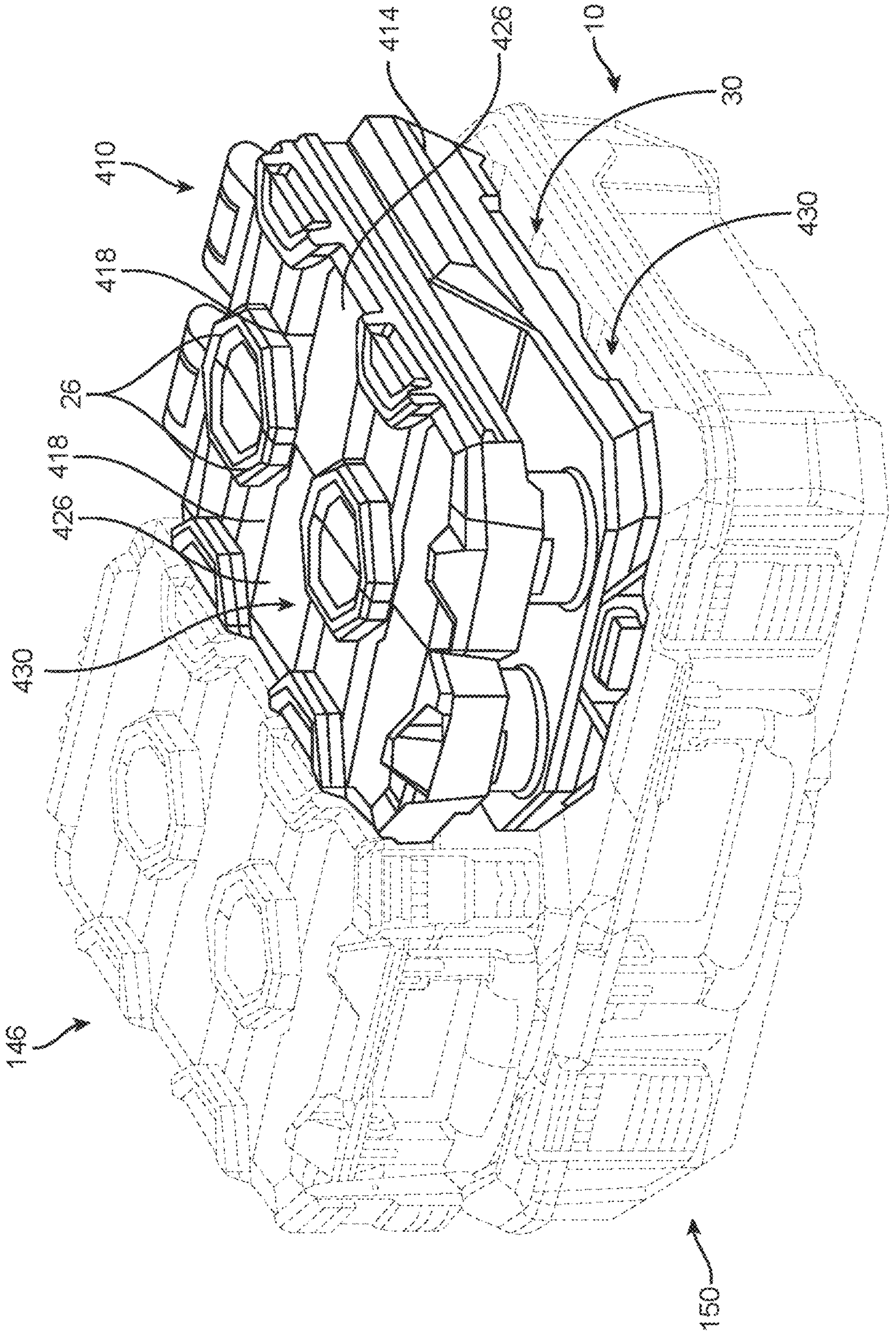
FIG. 11 is a perspective view of another storage box light embodying the present subject matter.
Figure 12:
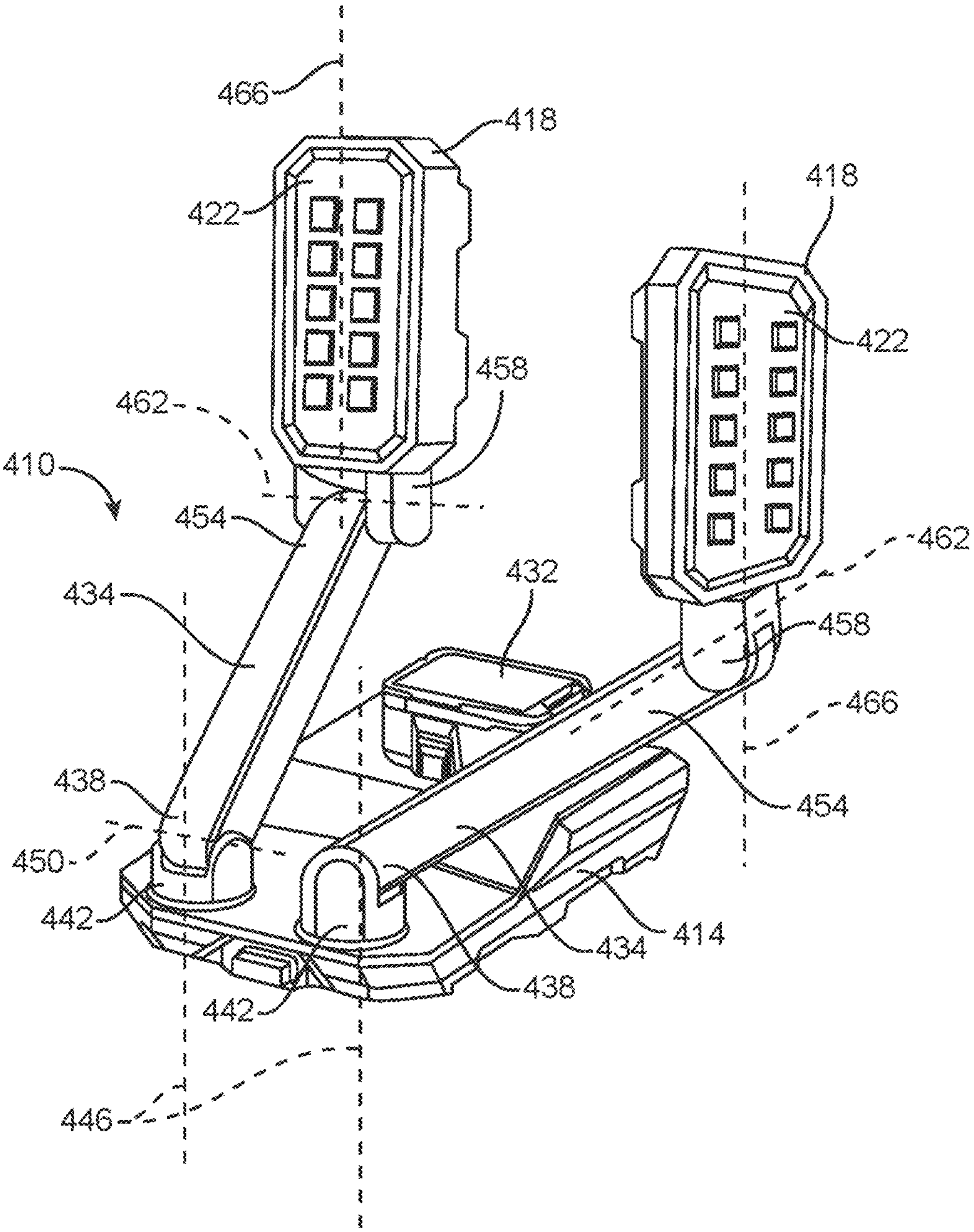
FIG. 12 is a perspective view of a storage box light of FIG. 11 and illustrating rotating and swiveling light panels.

FIGS. 11 and 12 illustrate another exemplary storage box light, light assembly 410, that interfaces with a storage box 10. The light assembly 410 includes a base 414 and a plurality of light panels 418, with each of the light panels 418 supporting a light source 422. The illustrated light assembly 410 includes two light panels 418, although fewer or more light panels 418 may be included. The light panels 418 include a surface 426 opposite the light source 422. The base 414 and surface 426 include mounting structures 430, such as depressions 30 positioned in the base 414 and protrusions 26 extending from the surface 426 which interface with the mounting structures 14 of a storage box 10 to position the light assembly 410 relative to the storage box 10. The light assembly 410 is the same size as a small storage box 146. The base 414 also can include a receptacle for a battery pack 432 or cord.

Each of the plurality of light panels 418 is connected to the base 414 by an articulating leg 434. The first end 438 of the articulating leg 434 is pivotally coupled to the base 414 via a base clevis 442. The base clevis 442 is pivotable relative to the base 414 about a first rotation axis base swivel axis 446, through a 360-degree range and the articulating leg 434 is pivotable relative to base clevis 442 about a second rotation axis, base pivot axis 450, through an angular range greater than 180 degrees. The light panel 418 is connected to the second end 454 of the articulating leg 434 by a head clevis 458. The head clevis 458 is rotatable relative to the articulating leg 434 about a third rotation axis, head pivot axis 462, through an angular range greater than 180 degrees. The light panel 418 is also pivotable relative to the head clevis 458 about a fourth rotation axis or head swivel axis 466 through a 360-degree range. The head pivot axis 462 is substantially perpendicular to the head swivel axis 466. The light panels 418 direct light in a direction substantially perpendicular to the head pivot axis 462 and the head swivel axis 466.

By pivoting about the head pivot axis 462 and the base pivot axis 450, the light panel 418 and articulating leg 434 transition from a "Z" shape when folded, to an "L" shape when the articulating leg 434 is upright, and to a substantially straight line when the light panel 418 is extended. When in the closed position, the light assembly 410, illustrated as being the same size as a small storage box 146, is capable of compact and secure storage with other storage boxes 10. In that regard, the light panels 418 can be positioned adjacent one another such that the length and width of the adjacent light panels 418 have an equivalent length and width as the base 414.

Figure 13:
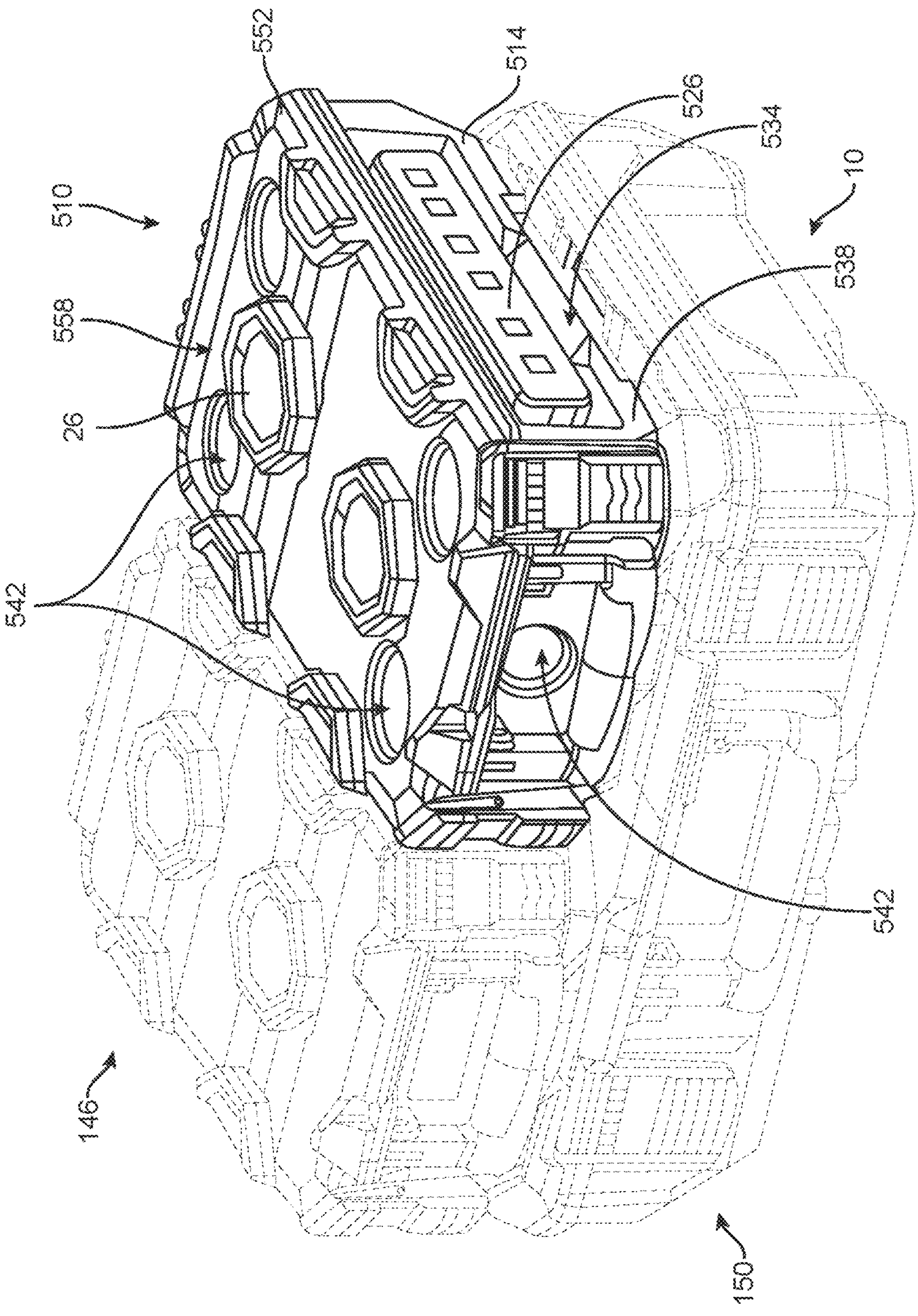
FIG. 13 is a perspective view of another storage box light embodying the present subject matter.
Figure 14:
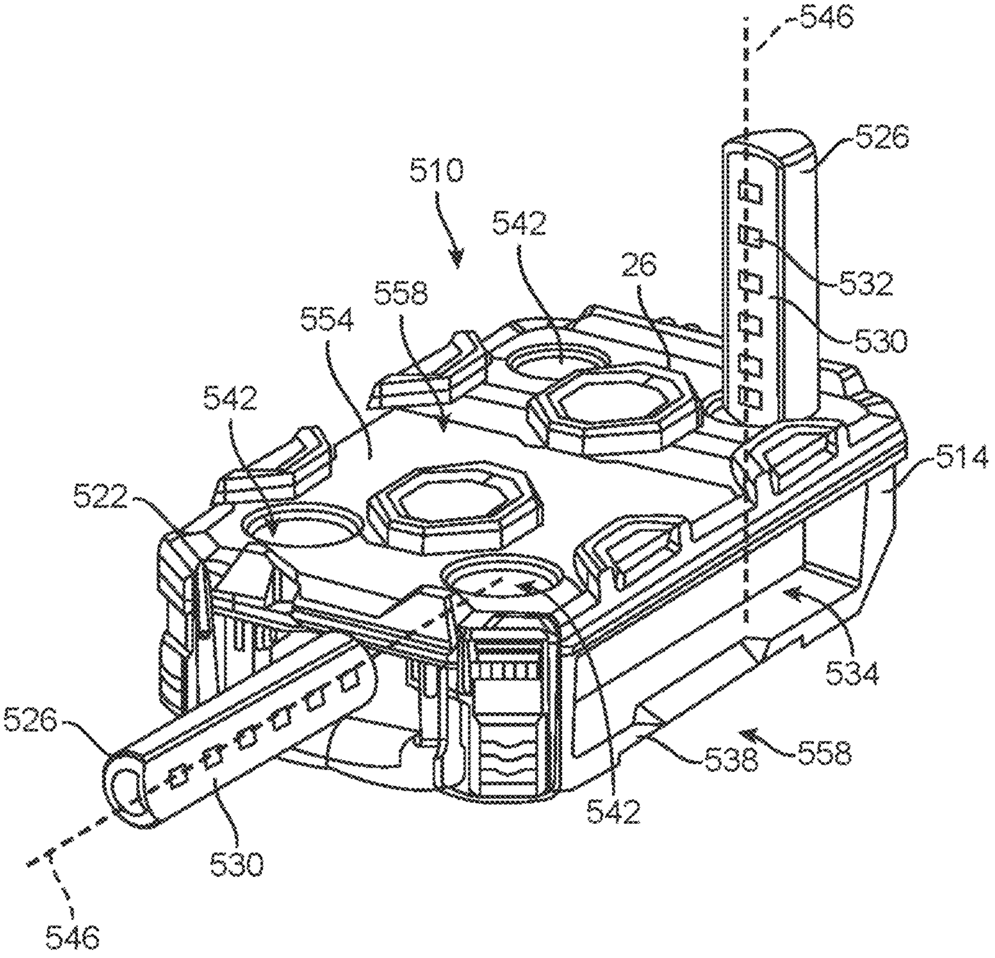
FIG. 14 is a perspective view of the storage box light of FIG. 13 and illustrating deployment and rotation of the exterior lights.

FIGS. 13 and 14 illustrate another exemplary storage box light, light assembly 510, including a base 514 that defines an interior compartment 518. The light assembly 510 also includes a lid 522, and two exterior lights 526 that each support a light source 530, (e.g., LEDs 532 or other source of illumination). Other quantities of exterior lights may be included instead. The illustrated exterior lights 526 are substantially cylindrical. A storage recess 534 is positioned in a side 538 of the base 514 and is configured to receive an exterior light 526 such that the exterior light 526 is substantially flush with the side 538 of the base 514 when the exterior light 526 is received in the storage recess 534, which defines the stored position of the exterior light 526 (illustrated in FIG. 13). The base 514 includes an equivalent number of storage recesses 534 as exterior lights 526. In the stored position, the light source 530 may be positioned to be directed outward from the storage recess 534.

The base 514 and lid 522 include a plurality of recesses 542 that extend inward from the base 514 and lid 522 and receive the exterior lights 526. When received in a recess 542, the exterior light 526 is in a deployed position (FIG. 14). When positioned in a recess 542, an exterior light 526 can rotate about a light axis 546 that is substantially coaxial with the length of the exterior light 526 and perpendicular to the base surface 550 or lid surface 554. The exterior lights 526 also can have preset rotational positions (e.g., defined by detents). In some constructions, the exterior lights 526 can be detached and operated independently from the light assembly 510. The base 514 connects to the storage box 10 via mounting structures 558, such as protrusions 26 that are the same as or similar to those described relative to FIGS. 1-4. The lid 522 also has mounting structures 14, such as protrusions 26, that can interface with the mounting structures 14, such as depressions 30, on the box base 18 of other storage boxes 10. The illustrated light assembly 510 is the same size as a small storage box 146.

Figure 15:
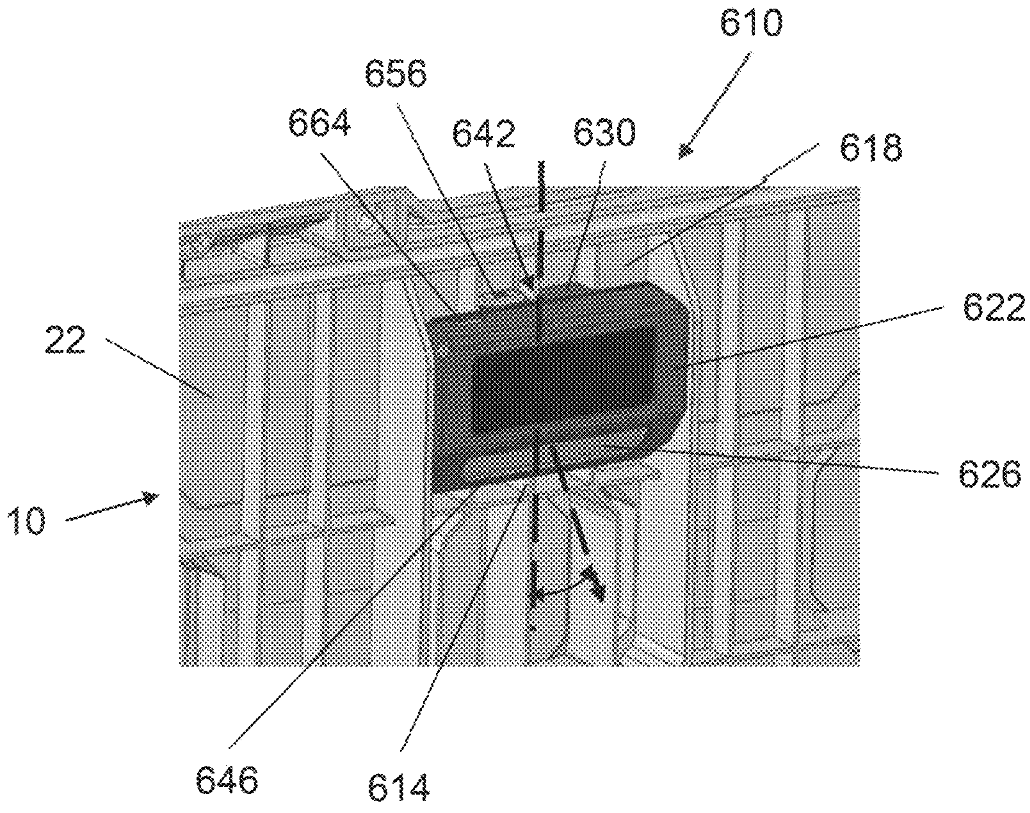
FIG. 15 is a perspective view of another storage box light embodying the present subject matter and coupled to a lid of a storage box of a modular storage system.
Figure 16:
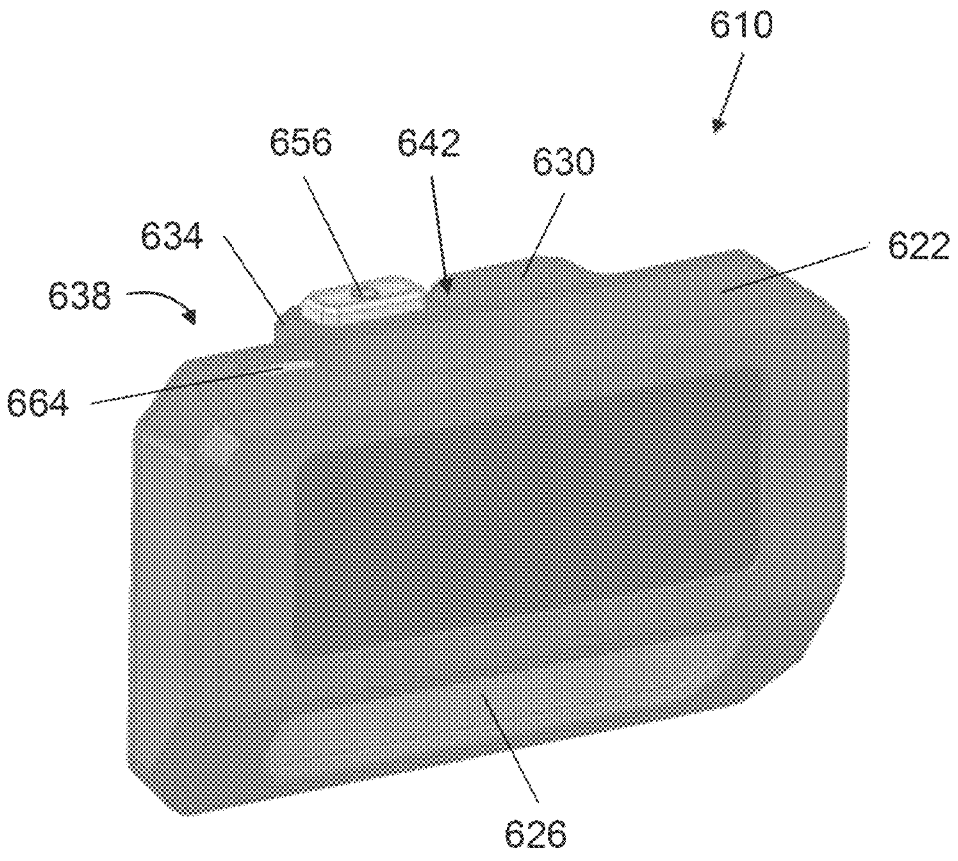
FIG. 16 is a perspective view of the storage box light of FIG. 15.

FIGS. 15 and 16 illustrate another embodiment of a storage box light, light assembly 610, that may be coupled to a lid 22 of storage box 10. As shown, the light assembly 610 is coupled to the lid 22 via a rib 614 on an interior side 618 of the lid 22. The light assembly 610 includes a housing 622 that supports a light source 626 (e.g., LEDs positioned on a printed circuit board) and that has a pair of legs 630, 634 extending from the housing 622 on a side 638 of the housing 622 opposite the light source 626. The legs 630, 634 cooperatively define a channel 642 into which the rib 614 is engaged (e.g., in an interference or frictional fit) to resist removal of the light assembly 610 from the lid 22 absent an adequate force. The housing 622 also may support a lens 646 over the light source 626. The light source 626 and the lens 646 are oriented so that the light source 626 shines light into the interior compartment 652 of the storage box 10. When the lid 22 is opened and the storage box 10 is placed on a horizontal surface, the lid 22 is generally upright (e.g., vertically oriented) and the illustrated lens 646 is angled outward and downward (as indicated by the arrow in FIG. 15) relative to the lid 22 adjacent a bottom of the light assembly 610). The housing 622 includes a switch 656 to turn the light assembly 610 on and off. A tilt switch 660 may be disposed inside the housing 622 and may turn the light assembly 610 on when the lid 22 is opened and may turn the light assembly 610 off when the lid 22 is closed. In addition, the illustrated light assembly 610 may have a charger port 664 (e.g., a USB-C port) to facilitate charging the light assembly 610.

Figure 17:
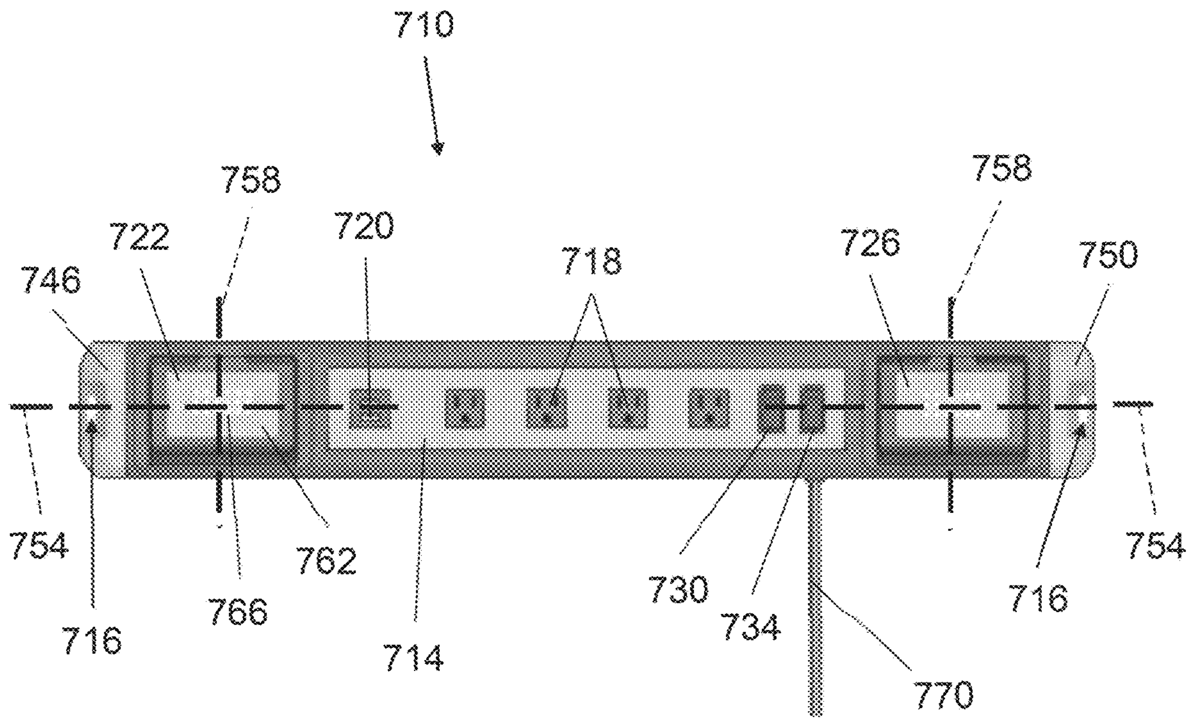
FIG. 17 is a top view of another storage box light embodying the present subject matter.

FIG. 17 illustrates another embodiment of a storage light assembly 710 including a power strip 714 that may be coupled to a storage box 10, another component of a modular storage system 62, or other structure. The illustrated light assembly 710 includes mounting structures 716 (e.g., holes) to engage another component or structure, although other mounting structures (e.g., cleats, hooks, etc.) may be included in addition to or separate from other mounting structure. The storage light 710 has high voltage ports 718 (e.g., electrical outlets), low voltage ports 720 (e.g., USB ports), a first light source 722, and a second light source 726, and first and second switches 730, 734. The illustrated storage light 710 includes four high voltage ports 718 and two low voltage ports 720, although other quantities of high and low voltage ports 718, 720 may be included. The first light source 722 is positioned at a first end 746 of the storage light 710 and a second light source 726 is disposed at an opposite, second end 750 of the storage light 710. Although the storage light 710 is illustrated as having two light sources 722, 726, other quantities of light sources may be included. The light sources 722, 726 may be positioned at other positions along storage light 710. The first and second light source 722, 726 are pivotable relative to the power strip 714 to provide flexibility for where light may be directed. For example, the first and second light sources 722, 726 may be pivotable about a first rotation axis 754 that is coextensive with the length of the storage light 710 and a second rotation axis 758 that is perpendicular or substantially perpendicular to the length of the storage light 710. The first and second light sources 722, 726 include a light board 762 that has LEDs 766. The storage light 710 receives power from an alternating current (AC) power source via a cord 770 and distributes power through the ports 718.

The first and second switch 730, 734 are operable to control power to the ports 718, 720 and to the first and second light sources 722, 726. In one example, the first switch 730 controls operation of the ports 718, 720 (i.e. whether the ports 718, 720 are able to power a load that is coupled to the corresponding port) and the second switch 734 is electrically coupled to turn the first and second light sources 722, 726 on and off simultaneously. In another example, the first light switch 730 may operate the high voltage ports 738 and the second switch 734 may operate the low voltage ports 742, and one or more separate switches may operate the light sources 722, 726. In yet another example, the first and second switches 730, 734 may individually turn the first and second light sources 722, 726 on and off, with one of switches 730, 734 used for one of the first light source 722 and the second light source 726 and the other switch 730, 734 used for the other of the first light source 722 or the second light source 726. In still other examples, the first and second switches 730, 734 may control the ports 718, first and second light sources 722, 726, and other components not illustrated, in other combinations.

A system may include any of the above described exemplary light assemblies 110, 210, 310, 410, 510, 610, 710. For instance, the system may include any of the exemplary light assemblies 110, 210, 310, 410, 510, 610, 710 coupled to a storage box 10, panel 70, or a rail 74, or placed on a table 66. In one embodiment, the system includes a storage box 10 and light assembly 310 coupled to the storage box 10 by mounting structures 314. In another embodiment, system includes a light assembly 410 coupled to a storage box 10. In another embodiment, the system includes a storage box 10 and a light assembly 510 is connected to the storage box 10. In other embodiments, the system may include other light assemblies coupled to a storage box or other component of a modular storage system.

The following features may be applicable to and included in any of the above described exemplary light assemblies 110, 210, 310, 410, 510, 610, 710. The exemplary light assemblies 110, 210, 310, 410, 510, 610, 710 may be operated when coupled to a storage box as part of a storage system or independently of a storage box or other component of a modular storage system. Where more than one light panel is included (i.e., the light assembly 210 with light panels 234, 238 embodied in FIGS. 7 and 8), the user may control each light panel separate from other light panels. The subject matter, as embodied above, may include or be supported by a tripod or stand or other fixture that allows for the storage box light to be used separate from a storage system. The subject matter may include storage space for extra power sources such as batteries. A storage tray of the storage box light, as embodied above, may include a magnetic tray for more securely holding metallic pieces. Additional charging interfaces, such as a USB port for a phone or tablet charger or for an 18v battery may be included. The storage box light, as embodied above, may include various additional mounting structures such as magnets, keyhole mounts, mounts accommodating a board having nominal dimensions of two inches by four inches (2×4), hooks, clamps, or the like.

The invention claimed is:

1. A system comprising:
a modular storage system; and
a light assembly including
a base including a mounting structure configured to be coupled to the modular storage system, the base defining an interior compartment,
a lid pivotally coupled to the base, and
a light source coupled to the base or the lid movable inward and outward relative to the base between a stored position and a deployed position.

2. The system of claim 1, wherein the base further defines a recess sized to removably receive the light source.

3. The system of claim 1, wherein the light source is in a deployed position when moved outward, and wherein the light source is detachable from the modular storage system in the deployed position.

4. The system of claim 1, wherein the lid defines a recess configured to removably receive the light source.

5. The system of claim 1, wherein the base defines a storage recess and the light source is removably coupled to the base within the storage recess in the stored position, and wherein the light source is removably disposed in the storage recess.

6. The system of claim 1, wherein the light source is a first light source, and the light assembly further includes a second light source that is movable independent of the first light source relative to the lid or the base.

7. The system of claim 1, wherein the lid includes a mounting structure configured to be coupled to a modular storage system.

8. The system of claim 1, wherein the light source is rotatable about an axis disposed perpendicular to a surface of the lid or a surface of the base.

9. The system of claim 1, wherein the light source is configured to pivot and/or rotate between the stored position and the deployed position.

10. The system of claim 1, wherein the light source is supported by a light panel, the light panel being movable inward and outward relative to the base between the stored position and the deployed position.

11. The system of claim 10, the base further comprising a storage recess configured to receive the light panel when the light panel is in the stored position.

12. The system of claim 11, wherein the light panel forms at least a portion of a side of the base when the light panel is in the stored position.

13. The system of claim 1, wherein the light panel is substantially flush with a side of the base when in the stored position.

14. The system of claim 1, wherein the light source is a first light source, the system further comprising at least a second light source.

15. The system of claim 14, wherein the first light source and the second light source are disposed on different sides of the base.

16. The system of claim 14, the at least a second light source further comprising a third light source.

17. The system of claim 16, wherein each of the first light source, second light source, and third light source are disposed on different sides of the base.

18. The system of claim 14, wherein the first light source is supported by a first light panel and the second light source is supported by a second light panel, wherein each of the first light panel and the second light panel are substantially flush with a side of the base when in the stored position.

19. The system of claim 1, wherein the light source is pivotable about a pivot axis through an angle of approximately 180 degrees.

20. The system of claim 1, wherein in the deployed position, the light source can rotate clockwise or counter-clockwise about a swivel axis up to 360 degrees of rotation.

* * * * *